United States Patent
Shrestha et al.

(10) Patent No.: US 6,995,943 B1
(45) Date of Patent: Feb. 7, 2006

(54) OFF-TRACK ERROR RECOVERY METHOD AND APPARATUS FOR DISK DRIVE

(75) Inventors: Rajita Shrestha, Westminster, CO (US); Chris Aumann, Broomfield, CO (US); Lace J. Herman, Boulder, CO (US); Glen Rewerts, Berthoud, CO (US); Dave Rewerts, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/317,849

(22) Filed: Dec. 11, 2002

Related U.S. Application Data

(60) Provisional application No. 60/339,267, filed on Dec. 11, 2001.

(51) Int. Cl.
*G11B 5/596* (2006.01)

(52) U.S. Cl. .................................. 360/77.08
(58) Field of Classification Search ............ 360/77.08, 360/48, 53, 60, 77.03, 77.04, 77.11, 78.14, 360/75, 31, 77.12, 135; 714/5, 704
See application file for complete search history.

(56) References Cited

U.S. PATENT DOCUMENTS

| | | | | |
|---|---|---|---|---|
| 4,530,020 A | * | 7/1985 | Sutton | 360/77.04 |
| 4,980,784 A | * | 12/1990 | Ogura | 360/77.11 |
| 5,253,131 A | * | 10/1993 | Chevalier | 360/78.14 |
| 5,319,509 A | * | 6/1994 | Michelson et al. | 360/77.03 |
| 5,331,476 A | * | 7/1994 | Fry et al. | 360/53 |
| 5,422,890 A | * | 6/1995 | Klingsporn et al. | 714/723 |
| 5,434,725 A | * | 7/1995 | Hirose et al. | 360/77.04 |
| 5,483,393 A | * | 1/1996 | Mento et al. | 360/77.08 |
| 5,490,149 A | * | 2/1996 | Nylander-Hill | 714/5 |
| 5,566,034 A | * | 10/1996 | Shumaker | 360/77.04 |
| 5,576,906 A | * | 11/1996 | Fisher et al. | 360/77.08 |
| 5,719,722 A | * | 2/1998 | Shimoda | 360/78.14 |
| 5,771,131 A | * | 6/1998 | Pirzadeh | 360/77.08 |
| 5,786,957 A | * | 7/1998 | Inoue et al. | 360/77.08 |
| 5,812,752 A | * | 9/1998 | Yamada | 714/5 |
| 5,867,353 A | * | 2/1999 | Valent | 360/135 |
| 5,995,305 A | * | 11/1999 | McNeil et al. | 360/31 |
| 6,014,754 A | * | 1/2000 | Yamada | 714/5 |
| 6,025,971 A | * | 2/2000 | Inoue et al. | 360/77.08 |
| 6,034,834 A | * | 3/2000 | Yoshikawa et al. | 360/75 |
| 6,043,952 A | * | 3/2000 | Liikanen | 360/77.08 |
| 6,049,439 A | * | 4/2000 | Ono et al. | 360/53 |
| 6,084,733 A | * | 7/2000 | Ohzeki et al. | 360/53 |
| 6,160,674 A | * | 12/2000 | Yun et al. | 360/60 |
| 6,178,058 B1 | * | 1/2001 | Pan et al. | 360/60 |
| 6,215,608 B1 | * | 4/2001 | Serrano et al. | 360/60 |
| 6,222,336 B1 | * | 4/2001 | McKenzie et al. | 318/448 |
| 6,392,831 B1 | * | 5/2002 | Yeo et al. | 360/53 |
| 6,445,529 B1 | * | 9/2002 | Mahr | 360/77.12 |
| 6,643,084 B1 | * | 11/2003 | Andrew et al. | 360/53 |
| 6,711,703 B2 | * | 3/2004 | MacLaren et al. | 714/704 |

* cited by examiner

*Primary Examiner*—David Hudspeth
*Assistant Examiner*—Fred F. Tzeng
(74) *Attorney, Agent, or Firm*—Tejpal S. Hansra

(57) ABSTRACT

An off-track error recovery method and apparatus for a disk drive are disclosed herein. Off-track errors are either due to vibration of the disk drive or due to defective servo data stored on a disk surface of the disk drive. In order to tailor error recovery operations associated with each of the two types of off-track errors, the present invention distinguishes between the two types of errors, when possible. Accordingly, the overall time for performing off-track error recovery operations is reduced and/or off-track error recovery operations are made more efficient.

40 Claims, 3 Drawing Sheets

FIG. 5

| OFF-TRACK SECTOR # | COUNTS | ON-TRACK SECTOR # |
|---|---|---|
| 2 | 1 | 4 |
| 10 | 3 | 15 |
| 42 | 2 | 49 |
| 99 | 1 | 110 |
| 120 | 1 | 123 |
| ⋮ | ⋮ | ⋮ |
| | | |
| | | |

FIG. 6

| OFF-TRACK SECTOR # | COUNTS | ON-TRACK SECTOR # |
|---|---|---|
| 27 | 9 | 44 |
| 83 | 1 | 85 |
| ⋮ | ⋮ | ⋮ |
| | | |
| | | |
| | | |

OFF-TRACK ERROR RECOVERY METHOD AND APPARATUS FOR DISK DRIVE

CROSS-REFERENCE TO RELATED APPLICATIONS

Priority is claimed from U.S. Provisional Patent Application Ser. No. 60/339,267 filed Dec. 11, 2001, which is incorporated herein by reference in its entirety.

FIELD OF THE INVENTION

The present invention relates to computer disk drives. More particularly, the present invention relates to an off-track error recovery method and apparatus for a disk drive.

BACKGROUND OF THE INVENTION

A disk drive is a data storage device that stores digital data in substantially concentric tracks on a data storage disk. During disk drive operation, the data storage disk is rotated about an axis while a transducer is used to read data from, or write data to, a target track of the disk. A servo control loop is used to position the transducer above the target track, while the data transfer is taking place. The servo control loop uses servo data read from a surface of the data storage disk as position feedback to maintain the transducer in a substantially centered position above the target track during the data transfer. However, because of positioning errors inherent in the disk drive and external forces, the transducer does not remain perfectly centered during the entire data transfer. Instead, the transducer remains within a positional range about the target track that is dictated by the mechanical properties of the drive.

When a transducer moves off-track during a write operation, there is a chance that the transducer might inadvertently write data on or near an adjacent track. In such situations, the data on the adjacent track may be corrupted. In addition, data that is written off-track by the transducer may be difficult or impossible to read during a subsequent read operation on the present track due to its off-track position.

In an attempt to prevent the writing of data on an adjacent track, disk drive manufacturers have developed off-track thresholds that indicate an off-track transducer position beyond which write operations will be suspended. Off-track thresholds may also be used in conjunction with performing read operations.

In general, two types of situations will cause the off-track threshold to be exceeded, thereby resulting in an off-track error. The first type of situation is due to vibration of the disk drive. The second type of situation is due to defective servo data.

When an off-track error is detected, the disk drive enters an error recovery mode. It is desirable to recover from an error as quickly as possible. If too much time is taken in attempting to recover from an error, a time-out error may be received from a host computer associated with the disk drive, which may cause the host computer to lock-up. In addition, if too much time is taken in attempting to recover from an error, disk drive performance requirements may not be met.

There are different types of ways for recovering from off-track errors due to vibration as opposed to recovering from off-track errors due to defective servo data. However, there has yet to be a technique which can distinguish between these two types of off-track errors.

Accordingly, it would be desirable to develop an error recovery method and apparatus that distinguishes between off-track errors due to vibration and off-track errors due to defective servo data, so that appropriate corrective action with respect to each type of error may be taken.

SUMMARY OF THE INVENTION

The present invention is designed to meet the aforementioned, and other, needs. The invention is directed to an off-track error recovery method and apparatus for a disk drive.

Off-track errors are either due to vibration of the disk drive or due to defective servo data stored on a disk surface of the disk drive. In order to tailor error recovery operations associated with each of the two types of off-track errors, the present invention distinguishes between the two types of errors, when possible. Accordingly, the overall time for performing off-track error recovery operations is reduced and/or off-track error recovery operations are made more efficient.

For example, in the case of off-track errors due to defective servo data, the time for performing off-track recovery may be reduced, since (at least some) off-track recovery procedures relating to vibration errors may be skipped. In the case of off-track errors due to vibration, reliability (e.g., likelihood of data recovery) may be increased, since additional time (and revolutions) may be spent attempting to read/write, as (at least some) recovery procedures relating to off-track errors associated with defective servo data may be skipped.

Other embodiments, objects, features and advantages of the invention will be apparent from the following specification taken in conjunction with the following drawings.

DETAILED DESCRIPTION OF THE PREFERRED EMBODIMENT

Figure 1:
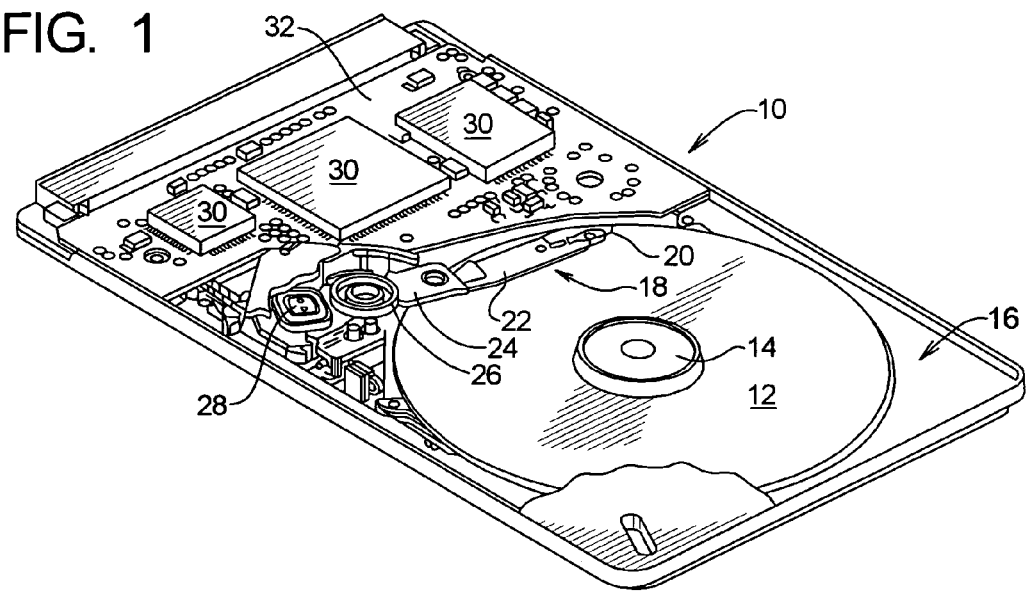
FIG. 1 diagrammatic representation illustrating a disk drive with which the present invention may be used.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

FIG. 1 illustrates a disk drive, generally designated 10, with which the present invention may be used. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 (having a write head and a read head) mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 may include a plurality of disks 12 and, therefore, a plurality of corresponding actuator arm assemblies 18. However, it is also possible for the disk drive 10 to include a single disk 12 as shown in FIG. 1.

Figure 2:
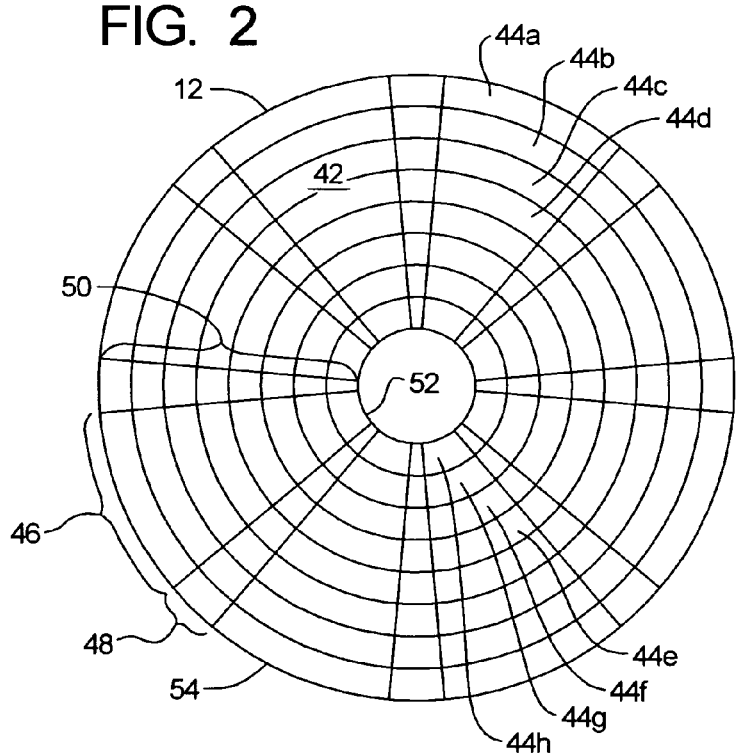
FIG. 2 is a diagrammatic representation of a top view of a magnetic storage disk illustrating a typical organization of data on the surface of the disk.

FIG. 2 is a simplified diagrammatic representation of a top view of a disk 12 having a surface 42 which has been formatted to be used in conjunction with a sectored servo system (also known as an embedded servo system). As illustrated in FIG. 2, the disk 12 includes a plurality of concentric tracks 44a–44h for storing data on the disk's surface 42. Although FIG. 2 only shows a relatively small number of tracks (i.e., 8) for ease of illustration, it should be appreciated that typically tens of thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54).

When performing a reading or writing operation, a determination is made as to whether an off-track error has occurred. Specifically, a comparison is made between an off-track threshold and a position error signal obtained by reading the servo information associated with a target track from which a data transfer is desired. If the position error signal exceeds the off-track threshold during a read or write operation, an off-track error has occurred and the disk drive enters an error recovery mode.

Figure 3:
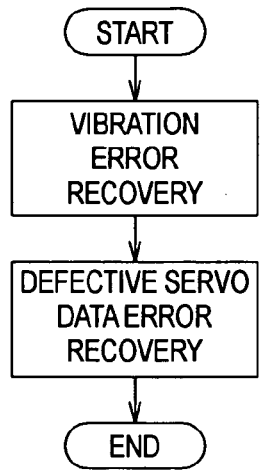
FIG. 3 is a flowchart illustrating a conventional off-track error recovery technique.

FIG. 3 is a flowchart that illustrates a conventional off-track recovery mode when performing a read operation. Since there was no prior method of distinguishing between off-track errors due to vibration and off-track errors due to defective servo data, and since corrective action associated with off-track errors due to defective servo data is more severe than corrective action associated with off-track errors due to vibration, attempts are made to read the desired data for many revolutions of the disk surface in case the off-track error is due to vibration. Error recovery steps associated with recovering from off-track errors due to defective servo data are performed only after exhausting all of the error recovery steps associated with recovering from an off-track error due to vibration.

For example, attempts might be made to read data from the desired track for 200 revolutions of the disk, in the hopes that the off-track error was due to vibration and that the vibration will stop before the 200 revolutions were completed. Steps would be taken to recover from an off-track error due to defective servo data only after the 200 revolutions were completed.

Such a process is inefficient for at least two reasons. First, if the system could determine that the off-track error was due to vibration, more attempts might be made to read data from the desired track before taking the relatively severe corrective action associated with recovering from an off-track error due to defective servo data. Second, if the system could determine that the off-track error was not due to vibration, fewer attempts might be made (and, hence, less time would be taken) to read data from the desired track before taking steps to recover from an off-track error due to defective servo data.

Accordingly, if a determination could be made as to whether an off-track error was likely due to vibration error or not, error recovery could be made more efficient. Among other things, the present invention provides a technique for determining whether an off-track error is due to vibration or not.

Figure 4:
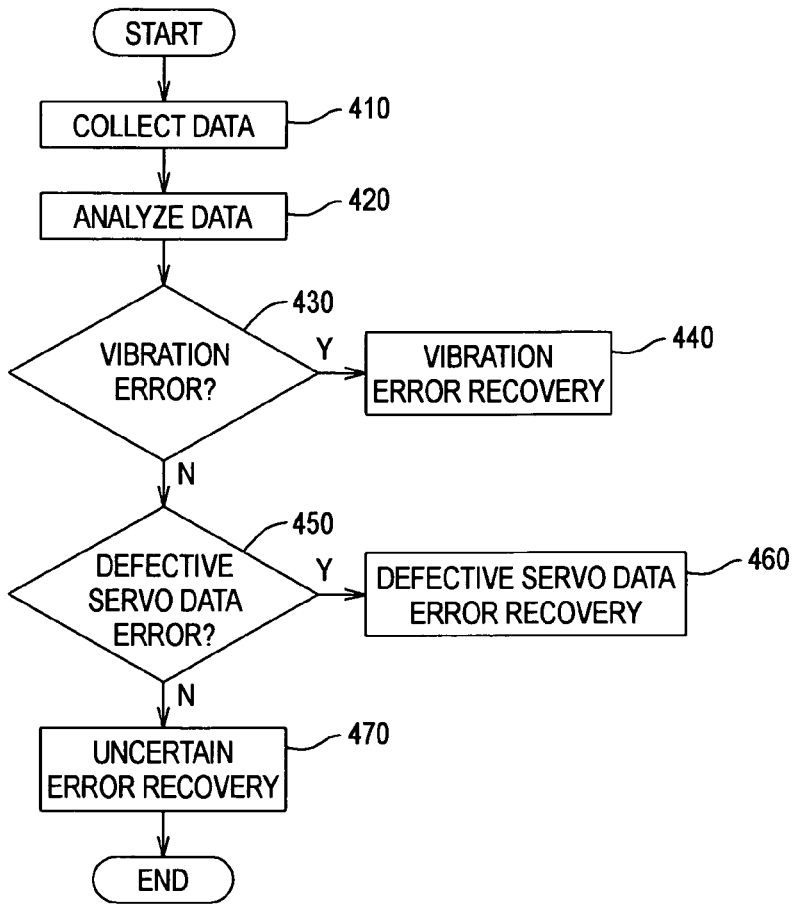
FIG. 4 is a flowchart illustrating an error recovery method, in accordance with one embodiment of the present invention; and, FIG. 5 illustrates a table that contains data that has been obtained in a data collection step associated with FIG. 4; and, FIG. 6 illustrates another table that contains data that has been obtained in a data collection step associated with FIG. 4.

FIG. 4 is a flowchart that illustrates an error recovery method in accordance with one embodiment of the present invention. After an off-track error has occurred, data is collected, as set forth in step 410. Data is collected while attempting to read data from the desired track for a predetermined number of revolutions (e.g., 10 revolutions). In one embodiment, a table is created of all of the servo sectors where an off-track error occurred, along with a count of the number of times an off-track error occurred at the servo sector during the predetermined number of revolutions. In addition, the table includes, for each unique servo sector where an off-track error occurred, the latest servo sector where an off-track error ceased to exist.

More specifically, servo sectors on a track are generally numbered to indicate their relative circumferential positions around the disk surface. The table includes the number of the servo sector where an off-track occurred, along with the number of times an off-track error occurred at that servo sector number. Furthermore, in order to determine largest circumferential portion of the track that was affected by an off-track error that occurred at the servo sector during the predetermined number of revolutions, a record is made of the number of the circumferentially-farthest servo sector where the off-track error ceased to exist.

Reference is made to FIG. 5, which illustrates an exemplary table used during (or developed after) the data gathering step 410. The first row in the table corresponds to an off-track error that occurred at servo sector number 2. Only one error occurred at servo sector number 2 during the predetermined number of data-gathering revolutions. The off-track error ceased to exist at servo sector number 4.

The second row in the table corresponds to off-track errors that occurred at servo sector number 10. As indicated in the table, three off-track errors occurred at servo sector number 10 during the predetermined number of data-gathering revolutions. Since multiple off-track errors occurred, they may have ceased to exist at different circumferential locations around the track. For example, the off-track error may have ceased to exist at sector number 13, when the first off-track error was detected. Similarly, the off-track error may have ceased to exist at servo sector number 15, when the second off-track error was detected. Likewise, the off-track error may have ceased to exist at sector number 12, when the third off-track error was detected.

In order to determine the largest circumferential portion of the track that was affected by the off-track error during the data-gathering revolutions, a record is made of the circumferentially-farthest servo sector where the off-track error ceased to exist (in the example, servo sector number 15). This information is especially useful when performing error recovery steps associated with defective servo data, as will be explained in more detail herein.

Referring again to FIG. 4, the collected data is then analyzed in step 420. Specifically, in determining whether an off-track error was due to vibration, a comparison is made between a first predetermined threshold and the number of error counts obtained during the data-gathering step. If none of the servo sectors have an error count that is greater than the first predetermined threshold, then a determination is made that the off-track error is likely due to vibration.

If any of the servo sectors have an error count that is greater than the first predetermined threshold, then a determination is made as to whether any of the sectors have an error count that is greater than a second predetermined threshold. If at least one of the servo sectors has an error count that is greater than the second predetermined threshold, then a determination is made that the off-track error is likely due to defective servo data.

On the other hand, if any of the servo sectors have an error count that is greater than the first predetermined threshold but less than the second predetermined threshold, then an uncertainty exists as to whether the off-track error is due to vibration or defective servo data.

In one embodiment, the data is collected for 10 revolutions, the first predetermined threshold is 3 and the second predetermined threshold is 7. It should be understood that the present invention is not limited to such values. If the aforementioned values were used in conjunction with data from the table of FIG. 5, a determination would be made that the off-track error is due to vibration.

Referring again to FIG. 4, if the off-track error was determined to be due to vibration (step 430), a vibration error recovery operation is performed (step 440). In such operation, further attempts are made to read the desired data for a predetermined number of revolutions of the disk. Generally, the number of revolutions (and, hence, attempts) will be relatively large, in the hopes that the vibration will subside or stop, so that the data may be read. In one embodiment, the predetermined number of revolutions associated with attempting to recover from an off-track error due to vibration is about 360 revolutions.

Generally, if it has been determined that the off-track error is due to vibration, the desired data will be able to be read using the above steps of the vibration error recovery operation. However, if the desired data still cannot be read, the steps associated with a defective servo data error recovery operation (described in detail below) are performed.

If it was determined that the off-track error was not due to vibration in step 430, but was determined to be due to defective servo data in step 450, a defective servo data error recovery operation is performed (step 460). In such operation, further attempts are made to read the desired data for a predetermined number of revolutions of the disk. Generally, the number of revolutions (and, hence, attempts) will be relatively small. These attempts are made as a fail safe measure, in case the error was erroneously determined to be due to a defective servo sector instead of vibration. In one embodiment, the predetermined number of revolutions associated with attempting to recover from an off-track error due to defective servo data is about 10 revolutions. In another embodiment, the predetermined number of revolutions is zero and the fail-safe measure is skipped altogether.

If the further attempts to read the desired data are unsuccessful, a flywheel recovery step is performed as part of the defective servo data error recovery operation. In the flywheel recovery step, the servo sector that is assumed to be defective (e.g., the servo sector with the greatest number of counts) is ignored by the disk drive's servo system. That is, the transducer is not repositioned based upon the servo sector that is assumed to be defective. Then, attempts are made to read the desired data for a predetermined number of revolutions of the disk. Generally, the number of revolutions (and, hence, attempts) during the flywheel recovery step are relatively small. In one embodiment, the number of revolutions associated with trying to read the desired data during the flywheel recovery step is about 18.

If the desired data is read during the flywheel step, it is written to a new location on the disk surface, in order to reduce the likelihood that similar errors will occur when reading such data in the future. Furthermore, as mentioned in connection with the data collecting step described using FIGS. 4 and 5, the reading of other data sectors may be affected by the defective servo sector. Accordingly, the disk drive reads and rewrites (at a new location) any data located between the defective servo sector and the circumferentially-farthest servo sector that was affected by the off-track error, as determined during the data collection step. For example, if the data collection step (step 410) resulted in a table similar to that shown in FIG. 6, data located between servo sector 27 and servo sector 44 would be read and, then, written to a new location.

Returning now to FIG. 4, if a determination cannot be made as to whether the off-track error is due to vibration or due to defective servo data, an uncertain error recovery operation (step 470) is performed. In such operation, further attempts are made to read the desired data for a predetermined number of revolutions of the disk. Generally, the predetermined number of revolutions (and, hence, attempts) for the uncertain error recovery operation will be less than the number of revolutions for the vibration error recovery operation, but greater than the number of revolutions for the defective servo data error recovery operation. In one embodiment, the predetermined number of revolutions is about 180 revolutions. If the desired data still cannot be read after the predetermined number revolutions, the steps associated with the defective servo data error recovery operation are performed.

When an off-track error occurs during a write operation, the operation of the system is generally the same. However, the flywheel recovery step is not used, since a significant risk exists in overwriting data on an adjacent (or other) track. In such case, instead of performing the flywheel recovery step, data is simply written to a different location on the disk surface, where off-track errors do not presently exist.

In one embodiment, instead of directly creating a table (as in FIG. 5), a list may be created of servo sector numbers where off-track errors occurred, along with the corresponding servo sector number where each of such off-track errors ceased to exist. In this embodiment, a table, like that of FIG. 5, would then be created from the list.

In another embodiment, instead of only collecting data associated with servo sectors when off-track errors occurred, position error signal measurements are collected for each servo sector. This data may be analyzed to determine whether an off-track error was due to vibration or due to a defective servo burst.

In one embodiment, the predetermined number of revolutions associated with collecting data (in step 410) are performed during a hidden re-read operation, which is incapable of being turned off by a customer, as will be understood by those skilled in the art. Furthermore, the predetermined number of revolutions associated with attempting to read data from the desired track in each of the vibration error recovery operation, defective servo data recovery operation, and the uncertain error recovery operation, are performed during a normal re-read operation, which can be turned of by a customer, as will be understood by those skilled in the art.

It should be understood that the present invention is not limited to the specific values given herein. Such values have been provided for illustrative purposes only.

The present invention may be implemented in the firmware of the controller, in software, or any other convenient place in the disk drive. In addition, the present invention may be implemented in a computer external to the disk drive.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface having a track written thereon and a head associated with the track, wherein the track includes servo sectors and data sectors;
   generating an off-track error based upon servo information read by the head from one or more of the servo sectors; and,
   determining whether the off-track error is due to a vibration error or due to a defective servo data error by collecting data associated with one or more servo sectors of the track, wherein the collected data includes a servo sector number associated with the off-track error.

2. The method of claim 1, further including the step of:
   performing a vibration error recovery operation if the off-track error is determined to be due to a vibration error.

3. The method of claim 1, further including the step of:
   performing a defective servo data error recovery operation if the off-track error is determined to be due to a defective servo data error.

4. The method of claim 1, wherein the collected data includes, for the off-track error, the servo sector number where the off-track error ceased to exist.

5. The method of claim 4, wherein the data is collected over a predetermined number of revolutions of the disk surface.

6. The method of claim 5, wherein a plurality of off-track errors are generated over the predetermined revolutions of the disk surface, wherein each of the plurality of off-track errors is associated with a servo sector number, and wherein the data collecting step further includes the step of:
   determining a count, over the predetermined revolutions of the disk surface, of the number of off-track errors associated with each of the servo sector numbers.

7. The method of claim 6, further including the step of:
   comparing the counts for each servo sector number with a first predetermined threshold.

8. The method of claim 7, further including the step of:
   determining that the off-track errors associated with each servo number are due to vibration when the counts do not exceed the first predetermined threshold.

9. The method of claim 7, further including the step of:
   for each servo sector number having counts which exceed the first predetermined threshold, comparing the counts for such servo sector numbers with a second predetermined threshold.

10. The method of claim 9, further including the step of:
    determining that an off-track error associated with a servo sector number that exceeds the second predetermined threshold is due to a defective servo sector.

11. The method of claim 1, wherein the step of determining is performed before taking specific corrective action to correct the off-track error.

12. A method comprising the steps of:
    providing a disk surface having a track written thereon and a head associated with the track, wherein the track includes servo sectors and data sectors;
    detecting that an off-track error has occurred based upon servo information read by the head from one or more of the servo sectors; and,
    determining whether the off-track error is due to a vibration error or a defective servo data error by collecting data associated with one or more servo sectors of the track, wherein the collected data includes a servo sector number associated with the off-track error.

13. The method of claim 12, wherein the collected data includes the servo sector number where the off-track error ceased to exist.

14. The method of claim 13, wherein the collected data includes the servo sector number where the off-track error began.

15. The method of claim 12, wherein the data is collected over a predetermined number of revolutions of the disk surface.

16. The method of claim 15, wherein a plurality of off-track errors are detected over the predetermined number of revolutions of the disk surface.

17. The method of claim 16, wherein each of the plurality of off-track errors is associated with a servo sector number where the off-track error began.

18. The method of claim 17, wherein each of the plurality of off-track errors is associated with a servo sector number where the off-track error ceased to exist.

19. The method of claim 17, further including the step of:
    from amongst the plurality of off-track errors, determining which of the plurality of off-track errors have a common servo sector number where the off-track error began.

20. The method of claim 19, further including the step of:
    for each of the plurality of off-track errors that have a common servo sector number where the off-track error began, maintaining a count of such off-track errors.

21. The method of claim 20, including the step of:
    determining that the plurality of off-track errors are due to vibration if no count exceeds a first predetermined threshold.

22. The method of claim 21, including the step of:
    determining that at least one of the plurality of off-track errors is due to a defective servo sector if the count associated with the off-track error exceeds both the first predetermined threshold and a second predetermined threshold, wherein the second predetermined threshold is greater than the first predetermined threshold.

23. The method of claim 22, including the step of:
    rewriting, to a new location, any data located between the servo sector number where the off-track error began and a servo sector number where the off-track error ceased to exist.

24. The method of claim 23, wherein the servo sector number where the off-track error ceased to exist is the circumferentially-farthest servo sector that was affected by the off-track error.

25. The method of claim 20, further including the steps of:
for each of the plurality of off-track errors that have a common servo sector number where the off-track error began, determining a servo sector number associated with where the off-track error ceased to exist; and,
of the servo sector numbers associated with where the off-track error ceased to exist, determining a servo sector number associated with a circumferentially-farthest distance from where the off-track error began.

26. The method of claim 12, further including the step of: storing the collected data in a list.

27. The method of claim 26, further including the step of: creating a table from the list.

28. The method of claim 12, further including the step of: storing the collected data in a table.

29. The method of claim 12, wherein the collected data is collected during a hidden re-read operation.

30. An apparatus comprising:
a disk surface having a track written thereon and a head associated with the track, wherein the track includes servo sectors and data sectors;
circuitry for detecting that an off-track error has occurred based upon servo information read by the head from one or more of the servo sectors; and,
circuitry for determining whether the off-track error is due to a vibration error or a defective servo data error by collecting data associated with one or more servo sectors of the track, wherein the collected data includes a servo sector number associated with the off-track error.

31. The apparatus of claim 30, wherein the collected data includes the servo sector number where the off-track error ceased to exist.

32. The apparatus of claim 31, wherein the collected data includes the servo sector number where the off-track error began.

33. The apparatus of claim 30, wherein the data is collected over a predetermined number of revolutions of the disk surface.

34. The apparatus of claim 33, wherein a plurality of off-track errors are detected over the predetermined number of revolutions of the disk surface.

35. The apparatus of claim 34, wherein each of the plurality of off-track errors is associated with a servo sector number where the off-track error began.

36. The apparatus of claim 35, wherein each of the plurality of off-track errors is associated with a servo sector number where the off-track error ceased to exist.

37. The apparatus of claim 35, further including the step of:
from amongst the plurality of off-track errors, determining which of the plurality of off-track errors have a common servo sector number where the off-track error began.

38. The apparatus of claim 37, further including the step of:
for each of the plurality of off-track errors that have a common servo sector number where the off-track error began, maintaining a count of such off-track errors.

39. The apparatus of claim 38, including the step of:
determining that the plurality of off-track errors are due to vibration if no count exceeds a first predetermined threshold.

40. The apparatus of claim 39, including the step of:
determining that at least one of the plurality of off-track errors is due to a defective servo sector if the count associated with the off-track error exceeds both the first predetermined threshold and a second predetermined threshold, wherein the second predetermined threshold is greater than the first predetermined threshold.

* * * * *